Feb. 25, 1969 R. A. SHALLAHAMER ET AL 3,429,981

SUPPORTING AND INSULATING MEANS FOR JUNCTURED ELEMENTS OF SMALL ELECTRICAL COMPONENTS

Filed April 12, 1967

INVENTORS
ROY ALLEN SHALLAHAMER
FRANK Y. NAITO
DONALD B. BERNES
BY Howard E. Thompson Jr.
ATTORNEY United States Patent Office 3,429,981

Patented Feb. 25, 1969

3,429,981

SUPPORTING AND INSULATING MEANS FOR JUNCTURED ELEMENTS OF SMALL ELECTRICAL COMPONENTS

Roy A. Shallahamer, Arcadia, Frank Y. Naito, Pasadena, and Donald B. Bernes, Sunnyvale, Calif., assignors to The Dexter Corporation, a corporation of Connecticut Filed Apr. 12, 1967, Ser. No. 630,369

U.S. Cl. 174—52 12 Claims

Int. Cl. H05k 5/06

ABSTRACT OF THE DISCLOSURE

Improved supporting and insulating means for junctured elements of transistors and other small electrical components comprising a header in the form of a cold pressed body of powdered epoxy resin composition having a plurality of apertures for slidably receiving element leads and communicating with a surface of said body providing the locus of junctures between said elements, particles of said resin composition, by reason of momentary exposure to pressure of the order of 30,000 p.s.i., being bonded sufficiently to impart substantial strength to the uncured body, and said resin composition being characterized as sintering and fusing slightly on curing and thus wets and bonds to leads arranged in said apertures. The curing is preferably deferred until a mass of compatible liquid epoxy resin is applied to the surface of the header which is the locus of the junctures between said elements to completely envelop the same whereby the header and liquid resin can be simultaneously cured to a virtually inseparable assemblage. Alternatively, the header can be at least partly cured immediately after positioning of the elements, to thereby form a subassemblage of the header with the elements firmly bonded therein, but not yet insulated.

BACKGROUND OF THE INVENTION

The support and insulation of junctured elements of transistors and other small electrical components presents troublesome problems in the presently known techniques. One approach has been the encapsulation of junctured elements in a bead or droplet of liquid resin, but a drawback is the relatively long time that the elements must be rigidly supported while the resin solidifies. In another approach the elements are canned, that is, sealed into a rigid protective container. This type of assemblage, however, tends to be quite sensitive to mechanical shock, and hence is undesirable for many uses of transistors and the like where resistance to mechanical shock is a prime objective.

The most generally accepted approach is to employ a preformed header of ceramic material having apertures to receive the element leads, with the junctured elements being encased in a cap or droplet of liquid thermosetting resin. The header acts in part as a heat sink to minimize temperature fluctuations in the component, and is some instances where a more effective heat sink is desired the header may be made of metal and act as one of the element leads. This, however, requires insulation of the other lead(s) passing through the header.

While the use of ceramic and metallic headers has been quite successful, there are two type problems which cause considerable difficulty. Since the lead receiving apertures through the header are of fixed dimension, the only firm anchorage of the leads in the apertures is achieved by seepage of encapsulating resin into the passage clearances around the leads. With the relatively viscous resins normally employed, and with mass production requiring rapid cure after applying the liquid resin, it is apparent that such seepage is unreliable. Furthermore, the bonding of encapsulating resin to the header frequently constitutes a weak point, and in many conventional transistors of the header type the resin cap can be wholly or partially chipped off in the normal rough handling to which such devices are subjected. If such chipping exposes the junctured elements, it of course destroys the insulation of the assemblage.

Attempts have also been made to employ headers made of molded epoxy resin, but these show no advantage over ceramic headers in adhesion or durability. This is probably due to the presence of mold release, necessary in an epoxy molding operation, acting to inhibit adhesion of the encapsulant to the header.

THE INVENTION

The present invention provides a new approach to the header type mounting of junctured elements in transistors capacitors, integrated circuits, and other small electrical components which overcomes both of the problems presently encountered in header type mountings. According to the present invention a header of the desired shape and contour is fashioned from powdered epoxy resin composition containing about 15 to 50% resin (resin and hardener) and 50 to 85% filler by a cold pressing or tableting type of operation which momentarily subjects the powder to a pressure of the order of 30,000 p.s.i. Such application of pressure compresses the particles, which should be of varied size in the 20–150 and preferably 60–100 mesh (U.S. Standard Sieve) range, into a dense, compacted mass having unusual strength and rigidity, even in the uncured state. For example transistor headers having a diameter of approximately 3/16 inch and a thickness of approximately 3/32 inch exhibit in the uncured state a compression strength in excess of 2,500 p.s.i. They are therefore more than adequately strong for the necessary subsequent manipulations in transistor assembly.

This degree of strength in uncured cold pressed headers is surprising, particularly in view of the high concentration of filler present. A possible explanation is that the momentary high pressure applied in forming the headers creates in the particle-to-particle contact brief surges of temperature sufficient to form within the mass a lattice of partially cured resin. If this is the case, however, it represents only a small fraction of a complete cure, since the mass being compressed remains non-fluid (presenting no problem of adhesion to the forming dies); and a complete cure requiring extended heating of the formed headers, i.e. a time and temperature within the range of about 30 min. at 500° F. to about 16 hours at 250° F., produces a compressive strength in excess of 25,000 p.s.i. and frequently of the order of 40,000 p.s.i.

The powdered resin composition employed in the cold pressed headers is made up of about 15 to 50% by weight of a solid epoxy resin/hardener system, 50 to 85% of filler including 0.3 to 2% of lubricant and, if desired, 0.1 to 5% of coloring agent. As filler any of the standard mineral fillers having good electrical insulating properties can be used, such as silica, alumina, zirconium silicate, barium sulfate, and calcium sulfate, particularly good results being obtained with alumina and zirconium silicate. The filler is preferably supplied in finely divided form, i.e., below about 100 mesh, suitably passing a 325 mesh sieve.

As coloring agents any of the conventional pigments or coloring agents generally used in epoxy resin systems can be employed, typical examples being carbon black and iron oxide blacks, titanium dioxide white, phthalocyanine blues and greens, iron oxide and mercury-cadmium reds and yellows. The amount of coloring agent is generally less than 5% and suitably about .2 to 1.5% of the composition.

A lubricant such as stearic acid, zinc stearate, or other metal stearates is employed in the amount of about 0.3 to 2% and preferably about 0.7 to 1.5% of the composition as an aid to compacting the particles in the cold pressing or tableting operation.

The resin system is preferably a solid polyepoxide having a melting point (Durrans mercury method) above about 130° F. and a solid curing agent of the anhydride type or difunctional amine type. Typical resins include reaction products of bisphenol A and epichlorohydrin having a molecular weight in the range of about 700 to 10,000. It is to be understood, however, that any solid epoxy resin having reactive epoxide groups providing an epoxide functionality of about 1.5 to 6.0 and melting within the range of about 130 to 400° F. can be employed. A solid epoxy resin which has been particularly effective in producing cold pressed headers is a glyoxal based resin available commercially as Epon 1031. This resin, which is made by reacting glyoxal with four moles of phenol and then with at least four moles of epichlorohydrin has a theoretical molecular weight of 625 and epoxy equivalent weight of 156, but due to some polymerization the commercial product has an average molecular weight of about 800 and epoxy equivalent weight of 200.

Solid anhydrides which can be employed as hardener or curing agent include cyclopentane dianhydride, trimellitic anhydride, pyromellitic dianhydride, benzophenone dianhydride, tetrahydrophthalic anhydride, tetrachlorophthalic anhydride and half esters of the foregoing, as well as maleic anhydride, and phthalic anhydride. Solid difunctional amines suitable as hardeners include metaphenylene diamine, methylene dianiline, and 4,4′-diamino-3,3′-dichloro diphenyl methane. The proportion of hardener to epoxy resin in the resin/hardener system is about 0.5 to 0.9 and preferably about 0.8 equivalent of hardener to each epoxide equivalent of the resin.

In preparing the powdered composition the filler and coloring agent is first blended with the resin by hot melt or by mixing on heated rolls, and the resulting blend, after cooling is broken and ground to a size of about 20 to 100 mesh. The curing agent is separately ground to about 60–80 mesh, and the two powders plus lubricant are dry mixed to a uniform powder. This powder is then blended on heated rolls for a minimum time to permit uniform mixing, and then is rapidly cooled, broken up and ground to about 20 to 100 mesh size to provide a free flowing powder ready for cold pressing or tableting.

As encapsulant for protecting and insulating junctured elements associated with a header a somewhat different type epoxy resin composition is employed, preferably a liquid composition comprising separate liquid resin and hardener components which are mixed shortly prior to use. Suitable epoxy resins include reaction products of alkylidine bisphenols, such as Bisphenol A, with epichlorohydrin having a molecular weight within the range of about 360 to 600, liquid epoxy novolac resins, and other liquid resins containing reactive epoxide groups. The hardener can be of the amine type, or of the anhydride type with a small amount of amine present as catalyst or accelerator. The liquid resin is preferably combined with (electrically) insulating filler, and coloring agent if desired, the amount varying to as much as 70% of the mixture, consistent with maintaining a fluid consistency. The hardener may also contain filler components up to about 70% of the mixture, but the amount should not be so great as to destroy the fluidity.

Suitable amine hardeners include metaphenylenediamine, methylenediamine, methylene dianiline, xylene diamines, isophorone diamine, and mixtures thereof. Suitable anhydride type hardeners include methyl nadic anhydride, hexahydrophthalic anhydride, and dodecylsuccinic anhydride, and with these an amine catalyst or activator such as benzyldimethylamine, 4 dimethylaminomethyl phenol, 2,4,6-tridimethylaminomethyl phenol, and 1-ethyl-4-methyl imidazole can be employed in small amounts, i.e., 0.5 to 10% based on the weight of anhydride.

The cure characteristics of the encapsulant can vary considerably depending on the intended manner of assembling electrical components. If the header is to be pre-cured the encapsulant can suitably be a composition which will cure at room temperature within 1 to 48 hours or within 20 min. to 5 hrs. when moderately heated to about 120 to 200° C. On the other hand, if the header and encapsulant are to be cured simultaneously the encapsulant can suitably have cure characteristics (time and temperature) similar to the header material, i.e., typically curing in about 16 hrs. at 200–250° F. Such an encapsulant composition will inherently have a much longer pot life than one intended for room temperature cure.

The epoxy resin encapsulant and epoxy resin cold pressed headers provide an exceedingly strong bond even when the header has been pre-cured. This is due in part to the porosity of the cold pressed headers. It is also apparently due in part to an enhanced wetting of the header by the encapsulant and some actual chemical bonding with the resin of the header. Neither of these actions are possible with ceramic headers, and with molded epoxy resin headers such actions are inhibited by the film of mold release which is inherently present.

When the epoxy resin header and epoxy resin encapsulant are cured simultaneously there appears to be a zone of copolymerization or material penetration at the interface, since the cured bodies will break as a unity, if stressed to the point of fracture, rather than separating at the interface.

Novel features of the present invention may be more readily visualized with reference to the accompanying drawing, in which a typical header and associated elements have been illustrated and identified by suitable reference characters in the several views and in which.

Figure 1:
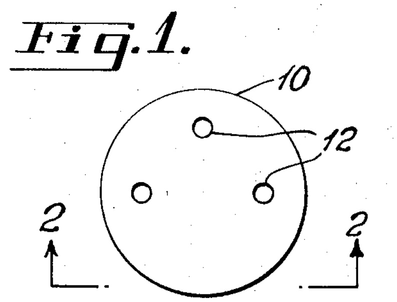
FIG. 1 is a plan view.

The header shown in the drawing, which is representative of headers used in transistors, is a cylindrical body 10 of cold pressed epoxy resin of the type described, having a diameter substantially twice as great as the height of the cylindrical wall 11; the actual article measuring about 3/16″ in diameter and 3/32″ in height. A plurality of parallel passages 12 extend axially through the cylindrical body 10 and suitably spaced from the periphery and from each other in substantially the manner shown in FIG. 1 for receiving the leads of electrical elements to be assembled in a transistor or the like.

Figure 3:
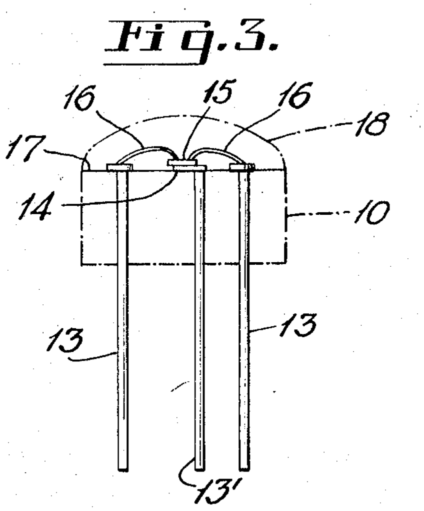
FIG. 3 is a diagrammatic representation of assembled transistor components in association with a header as shown in FIGS. 1 and 2, and indicating the location of encapsulant applied to the assemblage.

In the diagrammatic showing of FIG. 3, the elements of a transistor are indicated as comprising two headed leads or "nails" 13, and a third lead or "club" 13′ having an offset end 14, to which a silicon chip 15 is secured. The nails 13 are joined to the silicon chip 15 by suitable connecting wires 16 to complete the electrical assemblage, and in this connection, the upper surface 17 of the header 10 becomes the locus of the junctures formed between the electrical elements. At 18 there is diagrammatically illustrated the outline of a body of encapsulant applied to the surface 17 to envelop, protect, and insulate the electrical connections.

Figure 2:
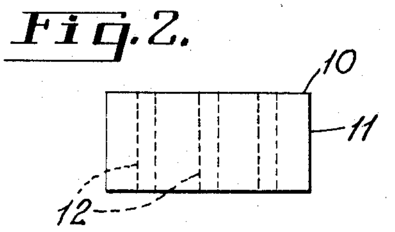
FIG. 2 is a side elevation view taken in the direction of the arrows 2—2 in FIG.1.
Figure 4:
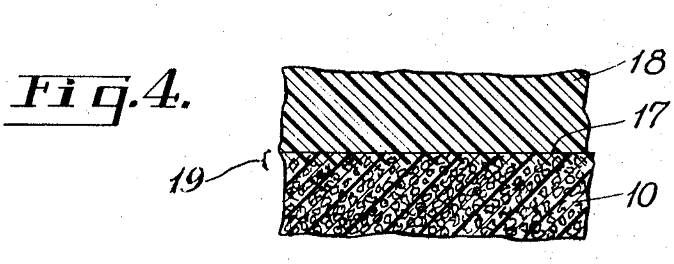
FIG. 4 is an enlarged fragmentary view of the interface between a pre-cured header and subsequently cured encapsulant.
Figure 5:
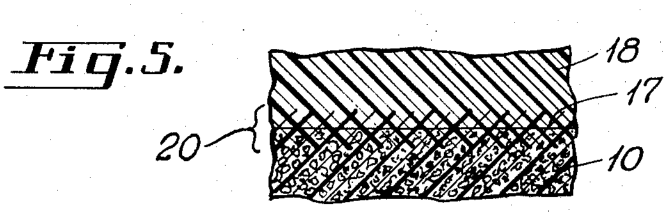
FIG. 5 is an enlarged fragmentary view of the interface between a simultaneously cured header and encapsulant.
Figure 6:
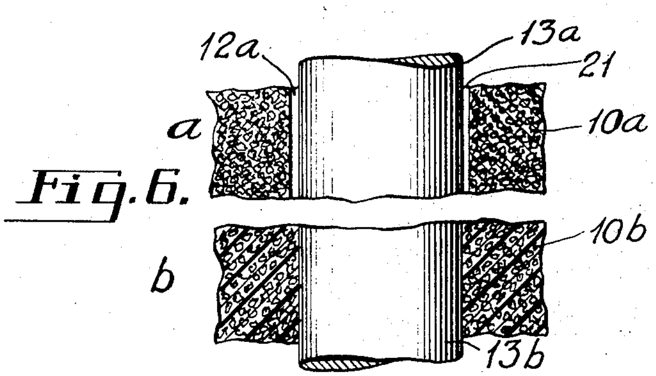
FIG. 6 is an enlarged composite view of a portion of a lead passage through a header with an electrical lead arranged therein and indicating at "*a*" the relationship before curing of the header, and at "*b*" the relationship after curing of the header.

The structural arrangement as shown in FIGS. 1 to 3 would be typical of any header type transistor assemblage or the like, and for visualizing the novel features of the present invention, it is essential to consider the details shown in FIGS. 4 to 6.

FIG. 4 is a much enlarged illustration of the interface between the surface 17 of a header 10 of cold pressed epoxy resin which has been completely pre-cured and a subsequently cured mass of encapsulant 18. By reason of the porosity of the header and the affinity of the epoxy resin encapsulant to the epoxy resin header, there is an appreciable zone of penetration of the later-cured encapsulant into the header, as indicated at 19. This affinity and resulting penetration at the interface provides a stronger bond between encapsulant and header than is possible if the header is fashioned from other materials, such as ceramics or metal.

FIG. 5 is similar to FIG. 4, but illustrates the somewhat different condition that prevails when the header 10 is not pre-cured, but is cured simultaneously with the curing of the encapsulant 18. In this instance there is a substantially thicker zone of penetration 20 extending deeper into the header 10 than the zone 19 in FIG. 4, and apparently extending somewhat into the encapsulant 18. In other words, in the simultaneous curing it appears that there is some migration and inter-polymerization of the epoxy resin systems of the header and encapsulant. The resulting bond between the simultaneously cured header and encapsulant becomes fully as strong as, and frequently stronger than, the material of either the header or the encapsulant alone.

FIG. 6 illustrates the preferred association between an electrical lead 13*a* (representative of any of the leads 13, 13') and the header, in which the aperture or passage 12*a* in an uncured header 10*a* provides a clearance as seen at 21, permitting free insertion of the lead 13*a*. Such clearance (shown greatly exaggerated) is suitably of the order of .005". When the header-lead assemblage is heated to curing temperature the sintering of the resin permits a wetting of the leads at points of contact with the leads, and this wetting appears to be enhanced by a heat concentraion in the metal leads and a capillary effect in the small clearance 21, so that the major portion of the lead within the passage becomes firmly bonded to the header as indicated at 10*b*, 13*b*.

To further aid in a full understanding of the invention, the following examples are presented to show typical formulations of epoxy resin for preparing cold pressed headers and fluid epoxy resin encapsulants for use therewith, but it is to be understood that these examples are given by way of illustration, and not of limitation.

*Example I*

Transistor headers substantially as shown and described in the drawing are prepared by a cold pressing on a Stokes Model 518–3, Die Set Press (operating at about 100 cycles per minute at a pressure of about 30,000 p.s.i.) using granular (60–100 mesh) epoxy resin formulations of the following compositions in parts by weight.

(A)

| | Parts |
|---|---|
| Epon 1031 glyoxal based resin | 15.3 |
| 325 mesh aluminum oxide | 79.3 |
| Cyclopentane dianhydride | 4.7 |
| Zinc stearate | 0.4 |
| Carbon black | 0.3 |

(B)

| | Parts |
|---|---|
| Epon 1031 | 15.3 |
| Zirconium silicate | 79.1 |
| Cyclopentane dianhydride | 4.7 |
| Stearic acid | 0.3 |
| Carbon black | 0.6 |

(C)

| | |
|---|---|
| Epon 1031 | 15.0 |
| 325 mesh aluminum oxide | 79.0 |
| Trimellitic anhydride | 5.0 |
| Carbon black | 0.6 |
| Zinc stearate | 0.4 |

In each instance the compositions are blended by compounding the resin, filler and coloring agent on heated rolls, then rapidly blending in the anhydride, cooling to the solid state and breaking and grinding to the 20–100 mesh size.

The headers prepared from the three compositions showed in the uncured state compression strength in excess of 2500 p.s.i., and when cured by heating for 16 hours at 300° F. showed compression strengths for the A, B and C samples of 38,200, 41,880 and 37,000 p.s.i., respectively.

The cold pressed headers above described have .024 in. diameter passages extending therethrough to freely receive .018 in. diameter leads of electrical elements. When the leads are inserted prior to curing there is, with each of the compositions A, B and C a sufficient sintering of the resin and wetting of the leads during cure to firmly bond the leads and prevent their axial withdrawal.

*Example II*

Following the procedure described in Example I headers were prepared using a granular epoxy resin formulation having the following composition.

| | Parts |
|---|---|
| Bisphenol A type epoxy resin, equivalent weight 475–550, melting point 160–176° F. | 22.1 |
| 325 mesh aluminum oxide | 74.0 |
| Methylene dianiline | 3.0 |
| Carbon black | 0.3 |
| Calcium stearate | 0.6 |

These headers showed a compression strength in excess of 2,500 p.s.i. before cure and in excess of 30,000 p.s.i. after 16 hour cure at 300° F.

*Example III*

Fluid epoxy resin encapsulant compositions for use with headers as described in Example I are prepared as two component systems having the following compositions in parts by weight:

ENCAPSULANT 1

| | Parts |
|---|---|
| Component A: | |
| ERL–2774, Bisphenol A resin having equiv. wt., 185–195, and viscosity 11,000–13,500 centipoises | 38.15 |
| Chromium oxide | 5.20 |
| Glycerine | .10 |
| Finely ground quartz | 56.55 |
| Component B: | |
| Metaphenylenediamine | 48.70 |
| Methylenedianiline | 39.80 |
| Phenyl glycidyl ether | 11.50 |

Mixing ratio: 100 parts A to 11 parts B.

ENCAPSULANT 2

| | |
|---|---|
| Component A: | |
| ERL–2774 | 29.85 |
| 325 mesh aluminum oxide | 70.00 |
| Carbon black | .15 |
| Component B: | |
| Metaphenylenediamine | 48.70 |
| Methylenedianiline | 39.80 |
| Phenyl glycidyl ether | 11.50 |

Mixing ratio: 100 parts A to 6 parts B.

ENCAPSULANT 3

| Component A: | Parts |
|---|---|
| ERL–2774 | 29.85 |
| 325 mesh aluminum oxide | 70.00 |
| Carbon black | .15 |
| Component B: | |
| Methyl nadic anhydride | 29.50 |
| 325 mesh aluminum oxide | 70.00 |
| Benzyldimethylamine | .50 |

Mixing ratio: 100 parts A to 80 parts B.

The pot life, cure characteristics and hardness are tabulated below.

| | Pot Life | Cure | | Shore D Hardness |
|---|---|---|---|---|
| | | Time, hrs. | Temp., ° F. | |
| Encapsulant: | | | | |
| 1 | 8 hr | 2 | 300 | 88 |
| 2 | 8 hr | 2 | 300 | 90 |
| 3 | 3 days | 16 | 250 | 90 |

The three encapsulants above described form strong bonds with cured headers A, B and C in Example I and with headers prepared as in Example II which are extremely difficult to break at the interface. When the encapsulants are applied to uncured headers, and the assemblage concurrently cured as by heating for 16 hrs. at 300° F. the bond becomes so strong that when subjected to crushing action the header and/or encapsulant will fracture before the zone of bonding.

It is to be understood that the headers of cold pressed epoxy resin in accordance with the present invention can be widely varied in peripheral size and shape, thickness, and surface contour in adapting the principle to the assemblage of different electrical components. In components of larger surface area, as in the case of integrated currents, it may be desirable to supplement the liquid layer of encapsulant with a second body of cold pressed resin to provide a sandwich-like assemblage of encapsulated electrical elements between two cold pressed resin bodies. In components of larger surface area it can also be advantageous to apply the encapsulant by a transfer molding technique to better control the amount and thickness of encapsulant. Such a technique, involving pressure in application, permits the use of encapsulant having more viscous properties than when encapsulant is applied without any pressure.

Various changes in the improved insulating and supporting means for junctured elements of electrical components as herein disclosed will occur to those skilled in the art, and to the extent that such changes and modifications are embraced by the appended claims, it is to be understood that they constitute part of the present invention.

We claim:

1. A header for mounting a plurality of junctured elements with elongated leads in forming small electrical components, said header comprising a mass of granular epoxy resin composition cold pressed at a momentary pressure of the order of 30,000 p.s.i. and having lead receiving passages extending therethrough, said epoxy resin composition having a particle size in the 20–200 mesh range with individual particles being a uniform blend of 15 to 50% by weight of epoxy resin and hardener and about 50 to 85% by weight of filler including 0.3 to 2% of lubricant and up to about 5% of coloring agent, said resin having a melting point in excess of about 130° F., the hardener being selected from the group consisting of solid carboxylic acid anhydrides and solid difunctional amines in the proportion of about 0.5 to 0.9 equivalent to each epoxide equivalent of resin, and said cold pressed mass being a porous structure of bonded particles having a compression strength prior to curing in excess of about 2500 p.s.i., and after curing in excess of about 25,000 p.s.i.

2. A header as defined in claim 1 wherein said epoxy resin has an epoxide functionality of about 1.5 and 6.0 and a melting point within the range of about 130 to 400° F., and the hardener is a solid anhydride selected from the group consisting of cyclopentane dianhydride, trimellitic anhydride, pyromellitic dianhydride, benzophenone dianhydride, tetrahydrophthalic anhydride, tetrachlorophthalic anhydride, half esters of the foregoing, maleic anhydride, and phthalic anhydride.

3. A header as defined in claim 1 wherein said epoxy resin has an epoxide functionality of about 1.5 to 6.0 and a melting point within the range of about 130 to 400° F., and the hardener is a solid difunctional amine selected from the group consisting of meta phenylenediamine, methylene dianiline, and 4,4′-diamino-3,3′-dichlorodiphenyl-methane.

4. A header as defined in claim 1 wherein said epoxy resin is a reaction product of bisphenol A and epichlorohydrin having a molecular weight within the range of about 700 to 10,000.

5. A header as defined in claim 1 wherein said epoxy resin is a reaction product of glyoxal with four moles of phenol and at least four moles of epichlorohydrin having an average molecular weight of about 800 and epoxy equivalent weight of about 200.

6. A header as defined in claim 1 wherein the filler is selected from the group consisting of silica, alumina, zirconium silicate, barium sulfate, and calcium sulfate.

7. A header as defined in claim 1 wherein the granular epoxy resin composition has a particle size within the range of about 60 to 100 mesh.

8. In small electrical components having a plurality of junctured elements with elongated leads, the improvement that comprises a subassemblage of said elements with a header as defined in claim 1 with the junctured elements disposed at one surface of said header and the leads extending through said header, in combination with an encapsulant adhering to said surface of the header and enveloping said junctured elements, said encapsulant being a fluid epoxy resin composition, whereby a strong bond is obtained through affinity of encapsulant for the resin of said header and penetration of encapsulant into the porous structure of said header.

9. The improvement in small electrical components as defined in claim 8 wherein the header is cured prior to affixing said elements.

10. The improvement in small electrical components as defined in claim 8 wherein the header is cured after affixing said elements whereby the leads become firmly bonded in said header.

11. The improvement in small electrical components as defined in claim 8 wherein an enhanced bond is obtained by simultaneous curing of the header and encapsulant.

12. The improvement in small electrical components as defined in claim 8 wherein the fluid epoxy resin composition consists essentially of a liquid epoxy resin, a hardener selected from the group consisting of amine hardeners and amine catalyzed anhydride hardeners, and filler components in amounts up to about 70% of said composition consistent with maintaining desired fluidity thereof.

References Cited

UNITED STATES PATENTS

| | | | |
|---|---|---|---|
| 2,864,057 | 12/1958 | Connelly et al. | 174—52 XR |
| 3,178,621 | 4/1965 | Glickman | 174—52 XR |

DARRELL L. CLAY, *Primary Examiner.*

U.S. Cl. X.R.

29—627; 317—234; 260—37; 264—272